United States Patent [19]

Hock

[11] 3,840,241
[45] Oct. 8, 1974

[54] VEHICLE WITH WHEELIE FEATURE
[75] Inventor: Donal D. Hock, Herrin, Ill.
[73] Assignee: Turco Manufacturing Company, Du Quoin, Ill.
[22] Filed: Sept. 5, 1972
[21] Appl. No.: 286,390

[52] U.S. Cl. .................................. 280/16, 280/1.1 R
[51] Int. Cl. .......................................... B62b 13/04
[58] Field of Search .................. 280/16, 17, 27, 1.1

[56] References Cited
UNITED STATES PATENTS

| | | | |
|---|---|---|---|
| 3,014,731 | 12/1961 | Divorak | 280/16 R |
| 3,026,121 | 3/1962 | Ellam | 280/16 R |
| 3,033,585 | 5/1962 | Marston et al. | 280/16 R |

Primary Examiner—Leo Friaglia
Assistant Examiner—Randall A. Schrecengost
Attorney, Agent, or Firm—Edward F. Levy

[57] ABSTRACT

A sled which can perform a maneuver similar to a "wheelie" maneuver typically performed by drag racing vehicles in which the front end of the vehicle lifts off the ground during rapid acceleration. The sled has a rear frame mounted on runners for stable movement on the ground, a forward frame pivotally mounted on the rear frame and extending in front of it, and a set mounted on the rear end of the forward frame. A bar fixed to the rear frame extends in front of the occupant who is in the seat, and when the occupant pushes against the bar the seat and forward frame pivot so that the occupant pivots backward and the forward frame lifts off the ground to provide the occupant with the sensation of performing a "wheelie."

9 Claims, 7 Drawing Figures

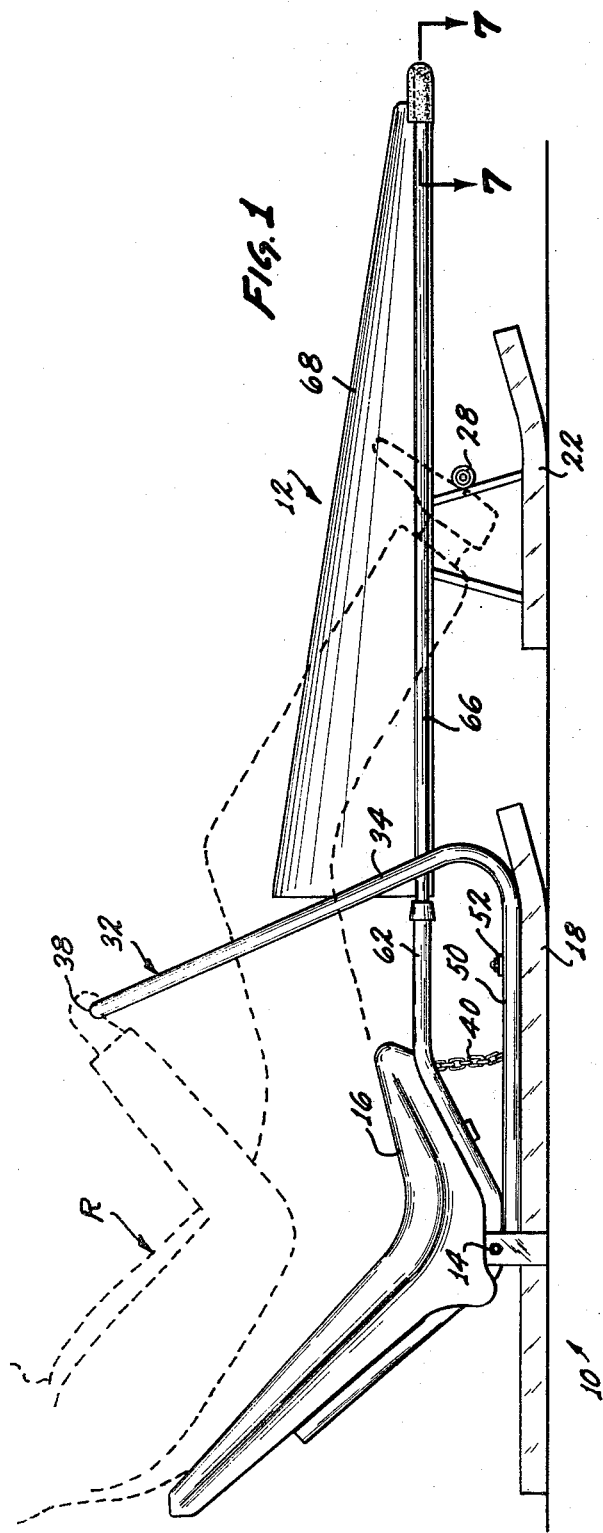
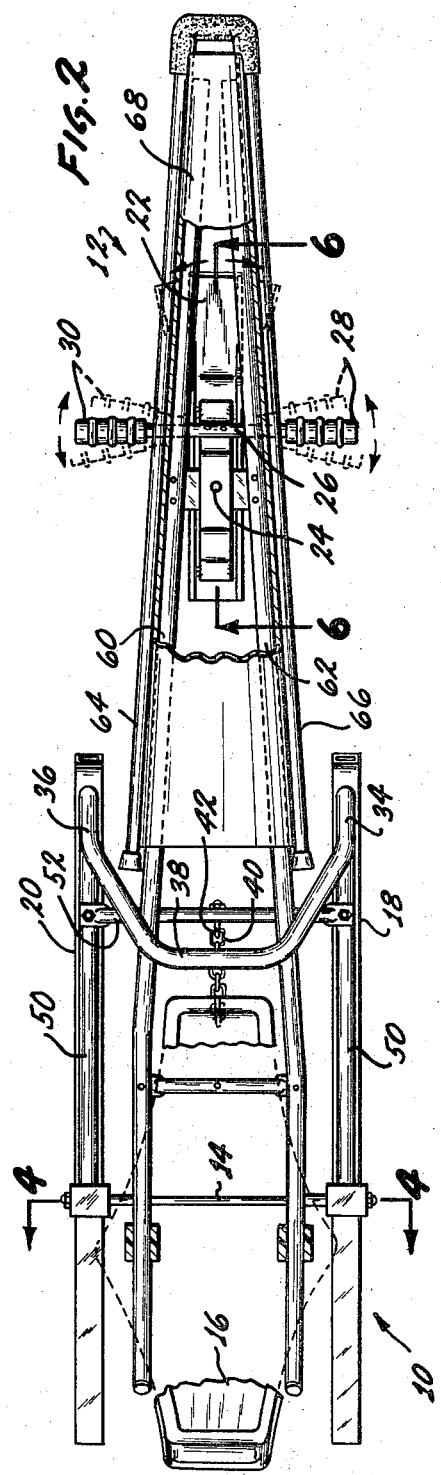

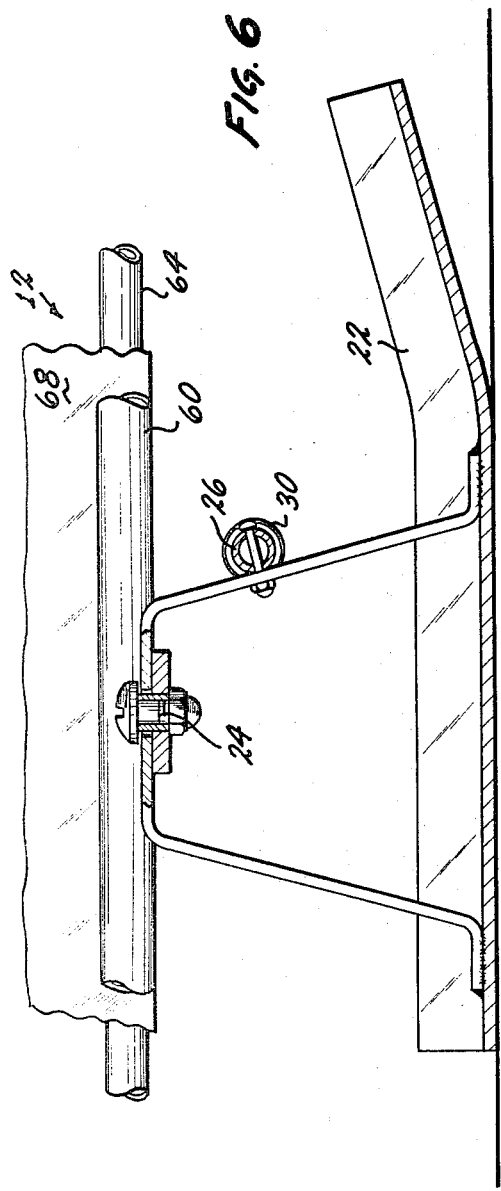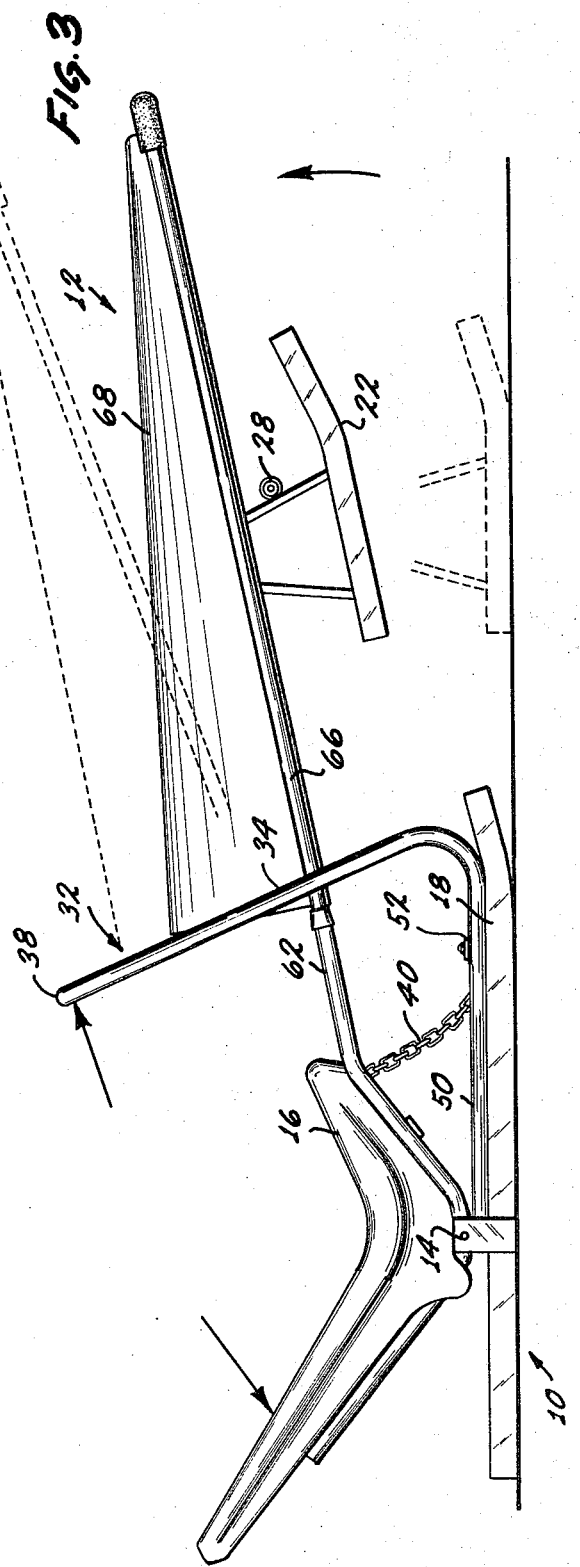

PATENTED OCT 8 1974 3,840,241
SHEET 3 OF 3

VEHICLE WITH WHEELIE FEATURE

BACKGROUND OF THE INVENTION

This invention relates to vehicles.

When drag racing vehicles accelerate rapidly, the front ends of the vehicles often lift off the ground, performing a maneuver commonly referred to as a "wheelie." Children enjoy simulating this maneuver on bicycles, and they can perform this by shifting their weight backwards on the bicycle during acceleration. The wheelie maneuver has heretofore been performable only on wheeled vehicles, inasmuch as it has required a vehicle with a rear ground-supporting portion that is unstable by itself so that it permits pivoting of the vehicle while supporting it in motion on the ground. Furthermore, the wheelie maneuver has been confined to vehicles that can be accelerated other than by the force of gravity. Thus, it heretofore has not been possible to perform a wheelie maneuver on sleds of the type used by children, inasmuch as long straight runners are required for low running friction and because such sleds have no apparatus for accelerating them (other than by gravity) such as is found in bicycles.

OBJECTS AND SUMMARY OF THE INVENTION

An object of the present invention is to provide a vehicle which can simulate a wheelie maneuver and yet which is movably supported on the ground in a stable manner during such a maneuver.

Another object is to provide a simple sled which can simulate a wheelie maneuver, and yet which can move with low friction and in a safe and stable manner during such a maneuver.

In accordance with one embodiment of the present invention, a sled is provided which can perform a simulated wheelie maneuver, and which also moves stably along the ground even during the maneuver. The vehicle includes a rear frame with a pair of laterally spaced runners for slidably supporting it in a stable condition on snow or ice, an elongated forward frame with a rear end pivotally mounted on the rear frame, and a seat mounted on the rear end of the forward frame. A control bar fixed to the rear frame extends in front of the occupant of the seat, so that he can push against the bar to pivot the seat and forward frame so as to perform a simulated wheelie maneuver. During the maneuver, the rear frame is stably supported on the ground and can slide with low friction along the ground.

The forward frame tapers in width from a narrow width at the front to a greater width at the rear. The control bar is in the form of an upside-down U, and the forward frame includes a pair of structural members extending at an angle from one another from the front of the frame rearwardly and passing between the legs of the U and attached to the seat. A front runner is pivotally mounted on a forward portion of the frame and a pair of foot rests are fixed to the runner. A rider can sit in the seat with his legs on either side of the U-shaped control bar and his feet resting on the foot rests. The occupant then can steer the vehicle with his feet during normal travel. At any time, however, the occupant can push against the control bar, and the seat and foot rests then pivot in a wheelie maneuver together with the forward frame to provide an entertaining movement.

The novel features of the invention are set forth with particularity in the appended claims. The invention will best be understood from the following description when read in conjunction with the accompanying drawings.

BRIEF DESCRIPTION OF THE DRAWINGS

FIG. 1 is a side elevational view of a vehicle constructed in accordance with the invention, shown during normal travel;

FIG. 2 is a plan view of the vehicle of FIG. 1, with portions broken away to show details of construction;

FIG. 3 is a side elevational view similar to FIG. 1, but showing the vehicle during a wheelie maneuver;

FIG. 6 is a view taken on the line 6—6 of FIG. 2; and

DESCRIPTION OF THE PREFERRED EMBODIMENT

Figure 4:
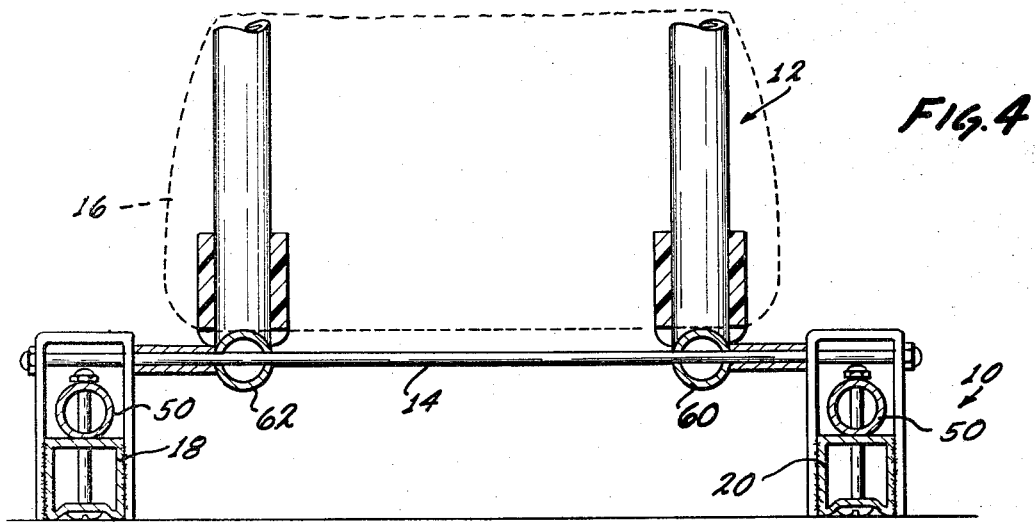
FIG. 4 is a view taken on the line 4—4 of FIG. 2.
Figure 5:
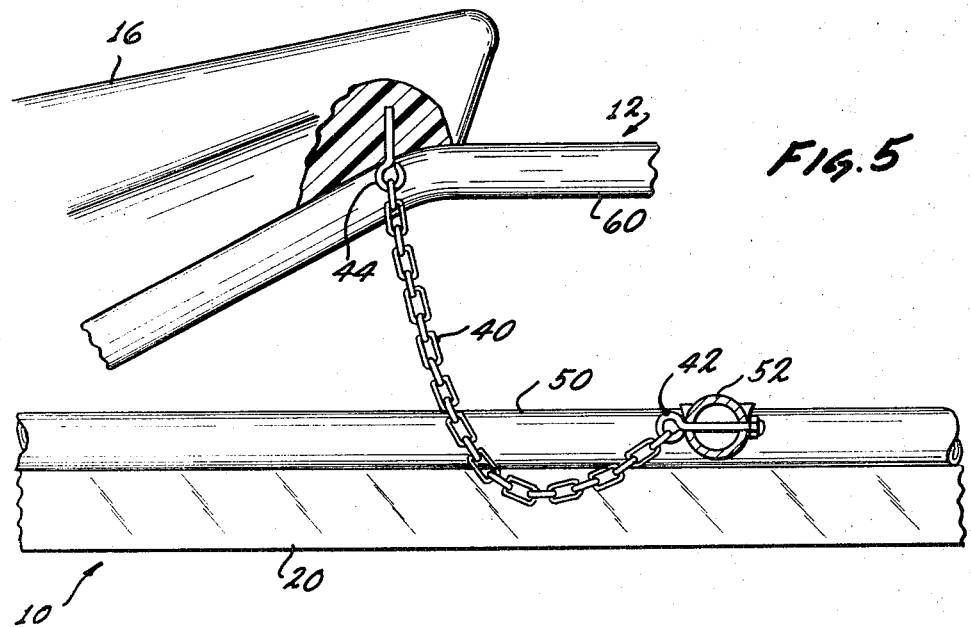
FIG. 5 is a partial view of the chain mechanism of the vehicle of FIG. 1.
Figure 7:
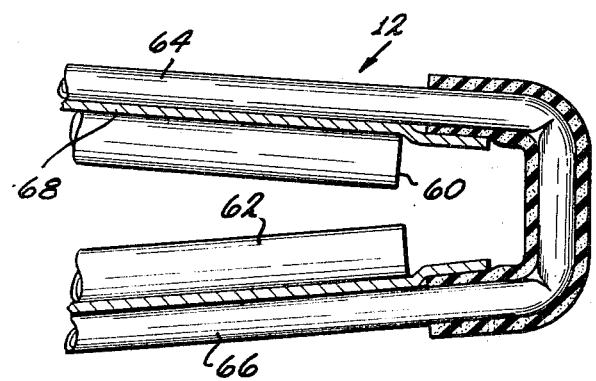
FIG. 7 is a view taken on the line 7—7 of FIG. 1.

FIGS. 1 and 2 illustrate the vehicle which includes a rear frame 10, a forward frame 12 pivotally mounted by an axle 14 on the rear frame, and a seat 16 mounted on the rear end of the forward frame. The rear frame 10 includes a pair of laterally spaced runners which stably support the rear frame on the ground, in low friction sliding along snow and ice. A front runner 22 is pivotally mounted on the forward frame, for pivoting about a vertical shaft 24, to support and steer the vehicle. A transverse member 26 is fixed to the front runner structure and forms a pair of foot rests 28, 30.

A rider R can sit in the seat 16 with his feet extending to the foot rests 28, 30 and he can ride the vehicle while steering it with his feet. A control bar 32 on the rear frame 10 is provided which extends in front of the seat 16 to a position where it can be comfortably grasped by the rider. The control bar is in an inverted U shape, and includes a pair of legs 34, 36 extending upwardly from forward portions of the runners 18, 20 and a cross part 38 extending between the upper ends of the legs and located directly in front of the rider. The separation of the legs 34, 36 of the control bar is small enough to allow the rider to position his legs outside of the control bar legs 34, 36 and with his feet on the foot rests, all in a comfortable manner.

The rider can perform a "wheelie" maneuver by pushing against the control bar 32. This causes the seat 16 and forward frame 12 to pivot with respect to the rear frame 10, as shown in FIG. 3. This maneuver causes the rider to pivot back while the front frame 12 lifts off the ground, which provides an entertaining motion that simulates the wheelie maneuver of drag racers. The maneuver can be performed not only when the vehicle is stationary, but also when it is moving on the ground. During the wheelie maneuver, the rear frame 10 continues to be supported by its runners 18, 20 in a stable manner and in a manner that provides low friction travel over snow and ice, even though there is an additional weight on the runners 18, 20 when the forward frame lifts off the ground. Thus, a child can start from the top of a hill and perform the wheelie maneuver as he accelerates down the hill, to provide not only the excitement of rapidly accelerating, but also to provide the additional entertainment in pivoting back, together with what appears to be most of the vehicle, in a maneuver simulating an automobile drag strip racer performing a wheelie during rapid acceleration. The amount of pivoting of the seat and forward frame is limited by a chain 40 which extends in a rearward direction from an eyelet 42 on the rear frame to an eyelet 44 which is attached to the seat 16 and therefore also to the forward frame 12.

The frames 10, 12 are largely constructed of tubular members. As shown in FIGS. 2 and 4, the rear frame includes a tube 50 whose forward portion forms the control bar 32 and which has a pair of rearwardly extending portions that lie on the runners 18, 20. A forward bracing tube 52 extends between the portions of the tube 50 that are located near the forward ends of the runners, and supports the chain-holding eyelet 42. The axle 14 which pivotally supports the seat 16, also serves as a brace for holding the rearward portions of the runners at a spaced distance.

The forward frame 12 includes a pair of elongated structural parts 60, 62 extending at a small angle from one another from the front portion of the forward frame, which provides a narrow region where the foot rests 28, 30 are located, so that the foot rests can project sidewardly from the frame but are still close enough together for comfortable holding of the feet. The wider separation between the structural parts 60, 62 at their rear ends enables them to securely support the seat 16. The parts 60, 62 pass between the legs 34, 36 of the control bar. If the forward frame should be pivoted very far, the parts 60, 62 will hit the control bar 32 to prevent further pivoting. However, the chain normally serves as the means for limiting the angle of pivoting. The forward frame has an additional pair of structural parts 64, 66 which also extend in a wedge alongside the other parts 60, 62 to provide added strength. A decorative cover 68 covers much of the forward frame to enhance the appearance.

Thus, the invention provides a vehicle that can move stably along the ground while performing a wheelie type maneuver, and particularly, provides a sled type vehicle which can perform such a maneuver. The sled includes a rear frame with a pair of laterally spaced runners for stably supporting itself during movement on the ground, a forward frame with a rearward end pivotally mounted on the rear frame and extending in front of the rear frame, and a seat coupled to the rear frame to pivot when the rear frame pivots. A control bar mounted on the rear frame extends to a position where it can be grasped by the rider, so that the rider can perform a wheelie by merely pushing back against the control bar. A chain limits the amount of pivoting. The forward frame is also provided with a runner and this forward runner is pivotally mounted to enable steering. A pair of foot rests on the forward runner not only permits steering, but also allows all parts of the rider, including his feet, to move in a pivoting motion when a wheelie is performed. The use of a separate rear frame that moves stably on the ground can be employed in wheeled vehicles by the use of three or more wheels for the rear frame, but the construction of the invention is particularly useful in the case of sled type vehicles which generally cannot slide with low friction along the ground unless they are supported on an elongated runner. Furthermore, the apparatus is particularly suited to vehicles that cannot be accelerated other than by gravity, to perform a wheelie without the need for a rapidly accelerating wheel to cause the front end of the vehicle to lift off the ground.

Although particular embodiments of the invention have been described and illustrated herein, it is recognized that modifications and variations may readily occur to those skilled in the art and consequently it is intended that the claims be interpreted to cover such modifications and equivalents.

What is claimed is:
1. A vehicle comprising:
 a rear frame having means movably supporting it on the ground in a stable condition;
 a forward frame having a back portion pivotally mounted about a horizontal axis of said rear frame and a frontward portion extending in front of said rear frame; and
 a seat mounted on the back portion of said forward frame to pivot with it, the pivot axis of said forward frame being located in close proximity to the center of gravity of the rider, whereby the forward frame and seat pivot vertically to simulate a "wheelie" type vehicle while maintaining vehicle stability.

2. The vehicle described in claim 1 including a control member mounted on said rear frame and extending to a position in front of the occupant position on said seat, for receiving pushing force by an occupant to pivot the forward frame and seat for simulating a "wheelie" type vehicle.

3. The vehicle described in claim 1 including means coupled to said rear frame for limiting the pivoting of said forward frame and seat to a predetermined angle in a "wheelie" maneuver.

4. The vehicle described in claim 1 wherein said means movably supporting the rear frame on the ground includes a plurality of sled runners for slidably supporting the rear frame on snow.

5. A sled which can simulate a wheeled vehicle performing a "wheelie," comprising:
 a rear frame having a pair of laterally spaced runners for slidably supporting the frame in a stable manner on snow-covered ground;
 a forward frame having a rear portion pivotally connected about a horizontal axis of said rear frame and a frontward portion extending in front of said rear frame; and
 a seat mounted to said rear portion of said forward frame to pivot as said forward frame pivots vertically relative to said rear frame, the pivot axis of said forward frame being located directly beneath said seat.

6. The sled described in claim 5 including a front runner mounted on said frontward portion of said forward frame to help support the weight of the forward frame on the ground.

7. The sled described in claim 5 including control bar means fixed to said rear frame and extending to a position in front of said seat, for receiving pushing forces by an occupant of the seat to permit him to pivot the seat and forward frame.

8. The sled described in claim 5 including chain means extending from a front end of the rear frame rearwardly to the forward frame, for limiting the angle of pivoting of the forward frame.

9. A sled comprising:

a rear frame which includes a pair of laterally spaced sled runners and a control member having a pair of legs extending upwardly from a position at the forward end portion of each runner and a cross part extending between the upper ends of the legs;

a forward frame which tapers in width and which includes a pair of elongated structural parts extending at an angle from one another so they spread apart in a rearward direction from the forward end portion of the forward frame, the rearward portion of said structural parts passing between the legs of said control member;

means for pivotally connecting the rear end of said forward frame to said rear frame;

a seat fixed to the rear end of said forward frame;

a forward runner pivotally mounted on a front portion of said forward frame; and a pair of foot rests connected to said forward runner and projecting from either side of the forward frame at a position to receive the legs of an occupant sitting in the seat and having his legs extending outside the upwardly extending legs of the control member.

* * * * *